United States Patent [19]
Krivec

[11] Patent Number: 5,277,531
[45] Date of Patent: Jan. 11, 1994

[54] DEVICE HAVING SOCKET WITH RETENTION SURFACES

[75] Inventor: Bert Krivec, Waukesha, Wis.

[73] Assignee: Snap-on Tools Corporation, Kenosha, Wis.

[21] Appl. No.: 942,990

[22] Filed: Sep. 10, 1992

[51] Int. Cl.⁵ .............................................. F16B 23/00
[52] U.S. Cl. ...................................... 411/403; 81/436
[58] Field of Search ............... 411/403, 407, 408, 404, 411/402, 919; 81/436, 53.2, 121.1, 441

[56] References Cited

U.S. PATENT DOCUMENTS

| | | | |
|---|---|---|---|
| 755,804 | 3/1904 | Smith | 81/436 X |
| 2,206,085 | 7/1940 | Fieg . | |
| 2,538,350 | 1/1951 | Baule . | |
| 2,592,462 | 4/1952 | Phipard, Jr. | 411/403 X |
| 2,676,510 | 5/1954 | Hodell . | |
| 2,777,353 | 1/1957 | Willis . | |
| 3,400,626 | 9/1968 | Bergere . | |
| 3,481,243 | 12/1969 | Gatz | 411/404 |
| 3,620,106 | 11/1971 | Dixon | 81/121.1 |
| 3,720,129 | 3/1973 | Lagasse . | |
| 4,242,932 | 1/1981 | Barmore . | |
| 4,355,552 | 10/1982 | Gutshall . | |
| 4,384,812 | 5/1983 | Miyagawa . | |
| 4,459,074 | 7/1984 | Capuano . | |
| 4,497,225 | 2/1985 | Vaughn . | |
| 4,947,712 | 8/1990 | Brosnan | 81/53.2 |
| 4,970,922 | 11/1990 | Krivec . | |
| 5,012,706 | 5/1991 | Wright et al. | 411/403 X |
| 5,019,080 | 5/1991 | Hemer . | |
| 5,105,690 | 4/1992 | Lazzara et al. | 81/436 |

*Primary Examiner*—Rodney M. Lindsey
*Attorney, Agent, or Firm*—Emrich & Dithmar

[57] ABSTRACT

A device includes a member having an axis and a socket recess formed axially therein. The recess is polygonal in shape at its open outer end and has planar drive surfaces parallel to the axis alternating with retaining surfaces disposed at the corners of the polygonal shape and sloping inwardly of the recess toward the axis. Each of the retaining surfaces is substantially triangular in shape, having one apex at the adjacent corner at the outer end of the recess and having the other apices in adjacent drive surfaces at the inner end of the recess. The device may be a rotatably drivable device, wherein the axis is the axis of rotation.

20 Claims, 2 Drawing Sheets

DEVICE HAVING SOCKET WITH RETENTION SURFACES

BACKGROUND OF THE INVENTION

1. Field of the Invention

The present invention relates to devices having female sockets adaptable for matably receiving a complementarily shaped male member. The invention has particular application to means for retaining the member in the socket.

2. Description of the Prior Art

Various types of rotatably drivable devices, such as drive sockets for wrenches and socket-head threaded fasteners, are provided with a female socket recess adapted for receiving a complementarily shaped male drive member. A typical form of such a drivable device has a polygonal socket recess formed in one end of the device coaxially with the axis of rotation. Various techniques have been used to facilitate retaining the drivable device on the associated driving tool or other drive member or, stated another way, to retain the driving tool or member in the socket recess. Various types of magnetic means have been used for this purpose.

Another technique is to so shape the socket recess and/or the drive member so as to provide an interference fit which will frictionally hold the parts together. Thus, for example, in my U.S. Pat. No. 4,970,922, there is disclosed a fluted driving tool which is adapted for engagement in a similarly shaped socket recess, the tool and socket recess having cooperating drive surfaces. The drive surfaces in the socket recess are substantially parallel to the axis of rotation while those on the drive member are given a slight helical twist about the axis of rotation so as to afford a wedge fit in the socket recess.

It has been considered desirable to provide a drivable device with a socket recess shaped such that, when used with a driving tool of standard shape, it will provide a retention fit. It is known to provide a socket-head screw with a hexagonal socket recess provided with a slight helical twist. Such an arrangement is disclosed in U.S. Pat. No. 2,538,350. However, that screw is specifically designed for use with a mating, helically twisted drive tool, and not with a standard drive tool. Furthermore, a helically twisted socket recess is very expensive to manufacture. Normally, female socket recesses are made by a forming or upsetting process wherein a forming tool is driven axially into the device to form the socket recess. In order to form a helically twisted socket recess, it is necessary to twist the forming tool during the forming operation, which requires the use of specialized tooling and equipment which is expensive to design and manufacture.

SUMMARY OF THE INVENTION

It is a general object of the invention to provide an improved device with a socket recess which avoids the disadvantages of prior devices while affording additional structural and operating advantages.

An important feature of the invention is the provision of a socketed device with a socket recess shaped to provide an interference retention fit with an associated male member adapted to be inserted into the socket.

In connection with the foregoing feature, a further feature of the invention is the provision of a rotatably drivable device with a socket recess shaped to provide an interference retention fit with an associated driving tool of standard shape.

In connection with the foregoing features, another feature of the invention is the provision of a rotatably drivable device of the type set forth which is of simple and economical construction.

In connection with the foregoing features, still another feature of the invention is the provision of a device of the type set forth wherein the socket recess can be made by a standard forming or upsetting operation.

These and other features of the invention are attained by providing a device comprising: a member having a socket recess formed therein, the recess having an open outer end and an inner end and a central axis extending therebetween and being polygonal in shape at the outer end thereof, the member having a plurality of drive surfaces defining the recess, the drive surfaces including a plurality of first surfaces substantially parallel to the axis and extending axially inwardly of the recess from the outer end thereof and a plurality of second surfaces inclined with respect to the axis and extending axially outwardly of the recess from the inner end thereof.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

DESCRIPTION OF THE PREFERRED EMBODIMENTS

Figure 1:
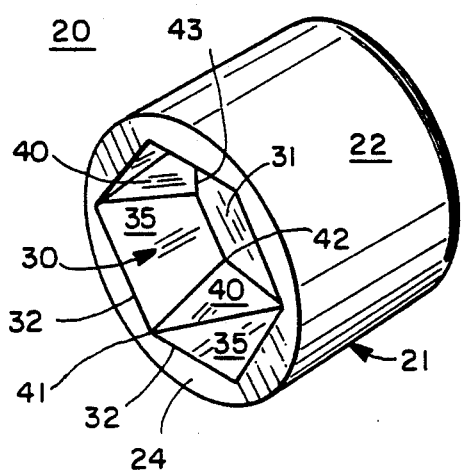
FIG. 1 is a perspective view of a rotatably drivable member in accordance with the present invention, the member being a drive socket for a socket wrench.
Figure 2:
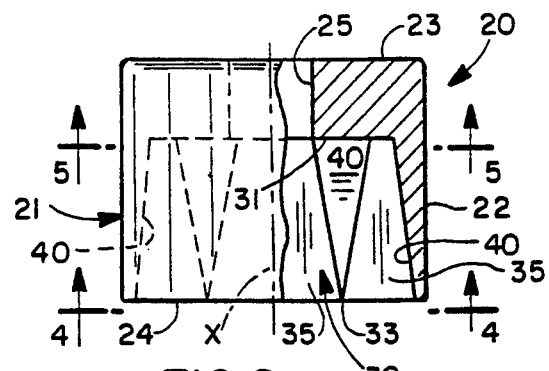
FIG. 2 is a side elevational view of the drivable member of FIG. 1, in partial vertical section.
Figure 3:
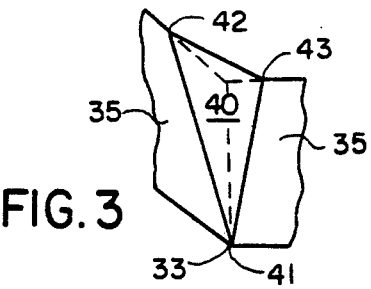
FIG. 3 is an enlarged, fragmentary, perspective view of a corner of the socket recess of the drivable member of FIGS. 1 and 2.
Figure 4:
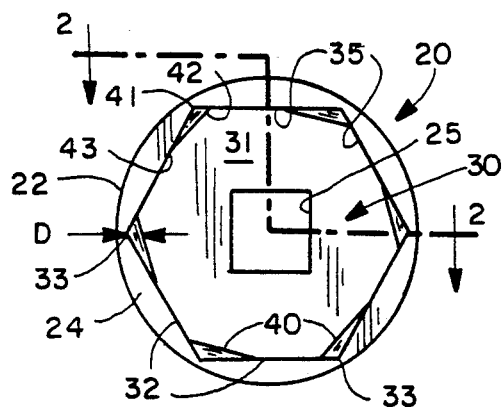
FIG. 4 is a plan view taken along the line 4—4 in FIG. 2.
Figure 5:
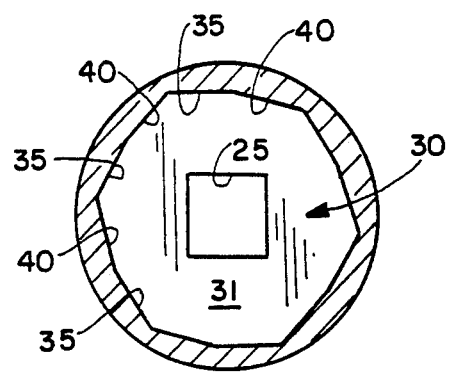
FIG. 5 is a sectional view taken along the line 5—5 in FIG. 2.

Referring to FIGS. 1-5, there is illustrated a drivable member in the nature of a drive socket 20 for a socket wrench. The socket 20 has a cylindrical body 21 with a cylindrical outer surface 22 and circular end surfaces 23 and 24. Formed in the end surface 23 centrally thereof is a square drive hole 25 adapted for receiving a drive lug (not shown) of an associated wrench or the like. The socket 20 has a rotational axis X extending through the centers of the end surfaces 23 and 24.

Formed axially in the end surface 24 is a socket recess 30, which extends into the cylindrical body 21, terminating in an inner end surface 31 and communicating with the square drive hole 25. The socket recess 30 has a regular polygonal shape at the open end thereof, i.e., at the end surface 24, the shape being hexagonal in the illustrated embodiment and including six equal-length sides 32 intersecting at six corners 33. The socket recess 30 has a plurality of side surfaces, including six planar drive surfaces 35, respectively extending from the sides 32 of the polygonal shape at the outer end surface 24 to the inner end surface 31, substantially parallel to the rotational axis X. The side surfaces of the socket recess 30 also include six planar retaining surfaces 40, respectively disposed at the corners 33 of the polygonal shape of the socket recess 30 and respectively alternating with the drive surfaces 35.

Preferably, each of the retaining surfaces 40 is inclined with respect to the rotational axis X, sloping from the outer end surface 24 to the inner end surface 31 laterally inwardly toward the axis X. More specifically, each of the retaining surfaces 40 is substantially triangular in shape, having apices 41, 42 and 43, with the apex 41 being disposed at the adjacent corner 33 of the polygonal shape of the socket recess 30 at the outer end surface 24, and with the apices 42 and 43 being respectively disposed at the junctions between the inner end surface 31 and the drive surfaces 35 at either side of the apex 41. The relationship between the retaining surfaces 40 and the drive surfaces 35 can better be understood from FIG. 3, which illustrates in phantom the corner line which would have resulted if the hexagonal shape at the open end of the socket recess 30 were continued all the way to the inner end surface 31. For purposes of illustration, the size of the retention surfaces 40 has been exaggerated in the drawings since, in practice, they would be difficult to see with the naked eye. Specifically, the angle that the bottom edge of the retention surface 40 (from apex 42 to apex 43) makes with the socket drive surface 35 at the apex 42 has been greatly exaggerated.

It is a significant aspect of the invention that it has been found that, for the dimensional ranges typically found in a common socket wrench set, for example, the sloping planar retaining surfaces 40 approximate the tilted surfaces which would be produced in a helical socket. However, the planar retaining surfaces 40 offer the significant advantage that they result in a drivable member 20 which can be fabricated by simple forming with a straight-in axial punch. More specifically, referring to FIGS. 6-8, the method of forming the socket 20 is diagrammatically illustrated. The process starts with the use of a cylindrical blank 50, having a cylindrical pilot hole 51 formed axially in one end thereof, the hole 51 preferably having a diameter slightly less than the across-flats dimension of the hexagonal socket recess to be formed therein. The socket recess 30 is formed with a hexagonal forming tool 55 having flat sides 56 intersecting at corners 57, the corners 57 being truncated at one end of the forming tool 55 to define tapered truncation surfaces 58 which slope laterally inwardly toward that end and toward the axis of rotation of the forming tool 55.

Figure 6:
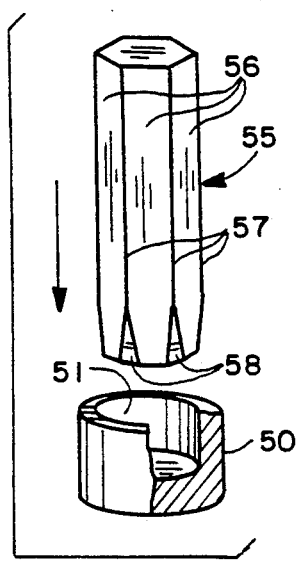
FIG. 6 is a perspective view of a blank for a drivable member, illustrated in partial section, and a forming tool for forming the drivable member of FIG. 1 from the blank.
Figure 7:
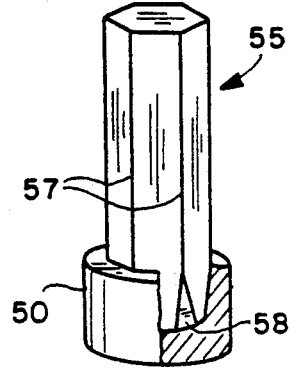
FIG. 7 is a view similar to FIG. 6, illustrating the cooperation of the forming tool and blank during the forming operation.
Figure 8:
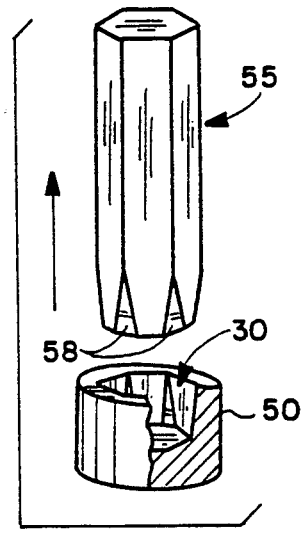
FIG. 8 is a view similar to FIG. 6 illustrating the separation of the forming tool and blank after formation of the drivable member.

In operation, the forming tool 55 is driven coaxially into the pilot hole 51 of the blank 50, in the direction of the arrow in FIG. 6, until it bottoms at the inner end of the pilot hole 51, as illustrated in FIG. 7, resulting in formation of the socket recess 30. The forming tool 55 is then withdrawn in the direction of the arrow in FIG. 8. It is significant that no rotational or twisting movement of the forming tool 55 is necessary.

In the illustrated embodiment, the tapered truncation surfaces 58 have the same axial length as the depth of the pilot hole 51 and, in formation, the forming tool 55 is driven into the blank 50 until it bottoms at the inner end of the pilot hole 51. This results in the configuration illustrated in FIGS. 1-5, wherein the apex 41 of each retaining surface 40 is disposed at the outer end surface 24 of the socket 20, while the apices 42 and 43 are disposed at the inner end surface 31 of the socket recess 30. However, it will be appreciated that this need not be the case. Thus, for example, if the forming tool 55 were driven deeper into the blank 50 than the axial extent of the tapered truncation surfaces 58, the resulting socket recess 30 would retain its hexagonal shape for a predetermined distance into the recess 30 before the sloping retaining surfaces 40 would commence.

Figure 9:
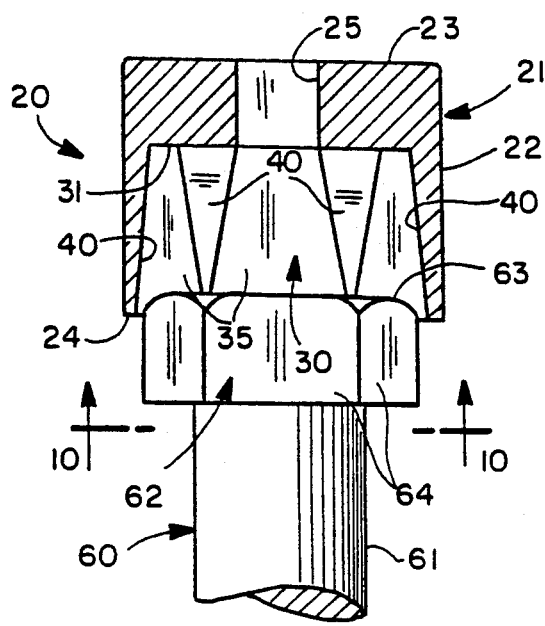
FIG. 9 is a sectional view through the drivable member of FIG. 1 along a diametrical plane thereof, illustrating an associated driven member at the beginning of insertion into the socket recess.
Figure 11:
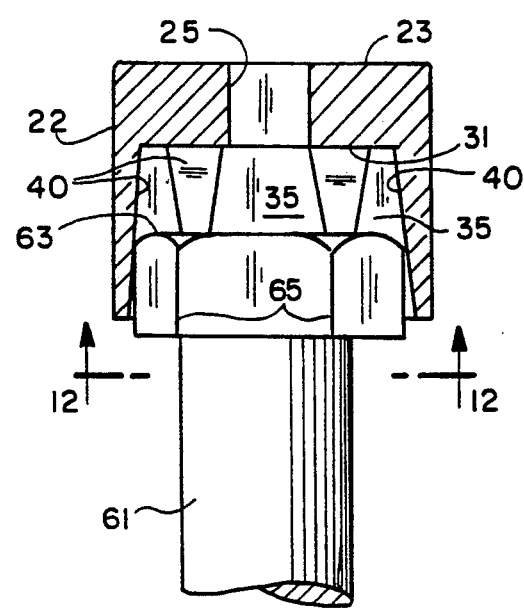
FIG. 11 is a view similar to FIG. 9, illustrating the driven member in engagement with the drivable member.
Figure 10:
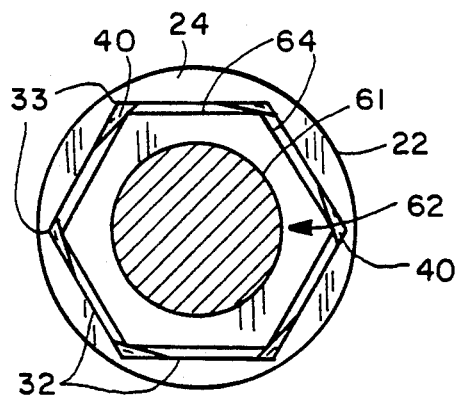
FIG. 10 is a sectional view taken along the line 10—10 in FIG. 9.
Figure 12:
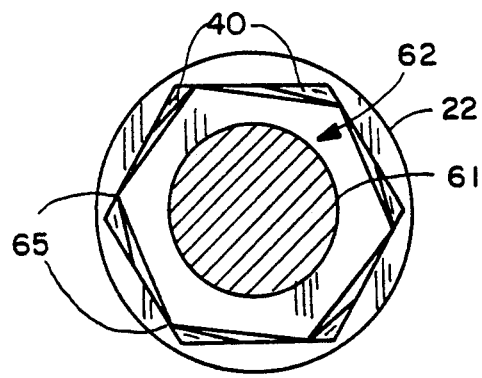
FIG. 12 is a sectional view taken along the line 12—12 in FIG. 11.

Referring to FIGS. 9-12, the operation of the socket 20 will be described in connection with an associated hexagonal fastener 60. In the illustrated embodiment, the fastener 60 is a bolt or screw having an elongated shank 61 and a hexagonal head 62, with an end face 63 which may be planar and six flat side surfaces 64 intersecting at corners 65. It will be appreciated that the fastener 60 could also be a hexagonal nut and the socket 20 will be the appropriate size for use with the fastener 60. As the fastener head 62 enters the open end of the socket recess 30, as illustrated in FIGS. 9 and 10, the corners 65 of the fastener 60 are, respectively, radially aligned with the corners 33 of the socket recess 30, there being a clearance space therebetween depending upon the manufacturing tolerances for the fastener 60 and the socket 20. As the fastener head 62 progresses axially into the socket recess 30, the corners 65 thereof will, respectively, engage the sloping retaining surfaces 40, as illustrated in FIGS. 11 and 12, producing a wedge fit which will serve to retain the fastener 60 in engagement in the socket 20. As the socket 20 is rotated for driving the fastener 60, there may result a slight relative rotation of the two, as indicated in FIGS. 11 and 12, but the fastener 60 will remain in retained engagement with the retaining surfaces 40.

The slope of the retaining surfaces 40 may vary within a range of angles. Fundamentally, the slope must be such that the radial distance D (FIG. 4), between the apex 41 and the projection in the plane of the outer end surface 24 of the line interconnecting the apices 42 and 43, must be such as to ensure that the corners 65 of the fastener head 62 will engage the retaining surfaces 40 before the fastener head 62 bottoms against the inner end surface 31 of the socket recess 30. It will be appreciated that this depends upon the initial clearance between the fastener head 62 at the open end of the socket recess 30 which is, in turn, a function of the manufacturing tolerances of the parts. It will also be appreciated that, the deeper the socket recess 30, the smaller may be the angle of inclination of the retaining surfaces 40 relative to the rotational axis X in order to ensure the desired distance D. In constructional models of the socket 20, angles from 5° to 10.5° have been found to be acceptable, but it will be appreciated that other inclination angles may be used, depending upon the dimensional relationships of the parts. Preferably, the retaining surfaces 40 will be configured so that they engage the associated fastener 60 well above the inner end surface 31 of the socket recess 30. This permits a certain amount of wear of the retaining surfaces 40 while still ensuring good retention engagement with the associated fastener 60. It also permits the socket 20 to be fabricated such that the size of the socket 20 is at the upper end of the permitted ANSI range, thereby making it easier to insert the fastener 60 in the recess 30.

Figure 13:
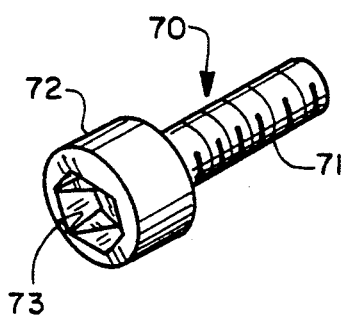
FIG. 13 is a perspective view of a socket-head fastener constructed in accordance with the principles of the present invention.

While the present invention has been disclosed in FIGS. 1-12 as embodied in a socket 20, it will be appreciated that the principles are applicable to any rotatably drivable member. Thus, for example, referring to FIG. 13, there is illustrated a fastener 70 having a threaded shank 71 and an enlarged socket head 72 having a socket recess 73 therein which is formed in accordance with the principles of the present invention. The fastener 70 is adapted to be driven by an associated drive member, such as a hexagonal wrench, commonly known as a hex key, or the like. When the drive member is inserted in the socket recess 73 there will be produced an interference retention fit in the same manner as was described above in connection with the socket 20. In like manner, the principles of the present invention may be applied to other types of rotatably drivable members.

Figure 14:
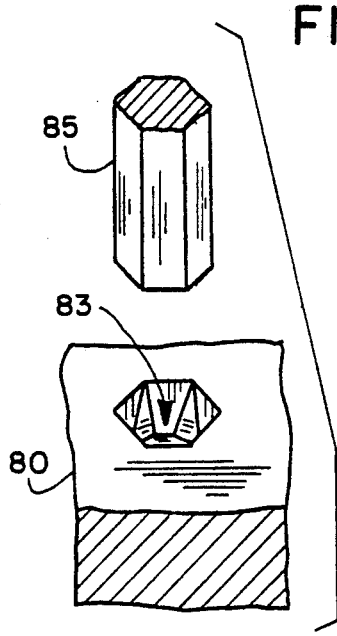
FIG. 14 is a perspective view of a socketed device and an associated male member for engaging in the socket.

While the foregoing embodiments are rotatably drivable devices, it will be appreciated that the principles of the present invention are applicable to any socketed device which is adapted to receive an associated male member in engagement in the socket. Referring to FIG. 14, there is illustrated a device 80 having a hexagonal socket recess 83 formed in the upper surface thereof in accordance with the principles of the present invention. An associated hexagonal male member 85 is adapted for engagement in the socket recess 83 in the same manner as was described above in connection with the socket 20 and the fastener 70 to provide an interference retention fit. In this manner, the male member 85 may be used to lift or otherwise move the device 80.

From the foregoing, it can be seen that there has been provided an improved device having a female socket which is configured to produce a retention interference fit with an associated male member, yet which may be formed inexpensively by a forming operation.

I claim:

1. A device comprising: a member having a socket recess formed therein, said recess having an open outer end and an inner end and a central axis extending therebetween and being polygonal in shape at the outer end thereof, said member having a plurality of drive surfaces defining said recess, said drive surfaces including a plurality of first surfaces parallel to said axis and extending from the outer end of said recess toward the inner end thereof and a plurality of second surfaces inclined with respect to said axis and extending from the inner end of said recess toward the outer end thereof.

2. The device of claim 1, wherein said member is a rotatably drivable member, said central axis being the axis of rotation.

3. The device of claim 2, wherein said member is a fastener.

4. The device of claim 2, wherein said member is a drive socket for a socket wrench.

5. The device of claim 1, wherein said first surfaces alternate with said second surfaces.

6. The device of claim 5, wherein said first and second surfaces are equal in number.

7. The device of claim 1, wherein said polygonal shape is hexagonal.

8. The device of claim 1, wherein each of said first surfaces is planar.

9. The device of claim 8, wherein each of said second surfaces is planar.

10. The device of claim 1, wherein each of said second surfaces is substantially triangular in outline.

11. The device of claim 10, wherein said polygonal shape includes a plurality of straight sides intersecting at a plurality of corners, each of said second surfaces having three apices, one of said apices being disposed at the outer end of said recess at a corner of the polygonal shape and the other two of said apices being respectively disposed on adjacent ones of said first surfaces at the inner end of said recess.

12. The device of claim 1, wherein each of said second surfaces slopes laterally toward said axis.

13. A device comprising: a member having a socket recess formed therein, said recess having an open outer end and an inner end and a central axis extending therebetween and a polygonal shape adjacent to the outer end thereof which includes a plurality of straight sides intersecting at a plurality of corners, a plurality of drive surfaces parallel to said axis, and a plurality of retaining surfaces disposed in said recess respectively at said corners, each of said retaining surfaces sloping toward the inner end of said recess and laterally toward said axis.

14. The device of claim 13, wherein said polygonal shape is hexagonal.

15. The device of claim 13, wherein each of said retaining surfaces is generally triangular in outline.

16. The device of claim 13, wherein said member is a rotatably drivable member, said central axis being the axis of rotation.

17. The device of claim 16, wherein said member has a plurality of drive surfaces disposed substantially parallel to said axis and alternating with said retaining surfaces for cooperation therewith to define said recess.

18. The device of claim 17, wherein each of said retaining surfaces is generally triangular in shape having three apices, one of said apices being disposed at the adjacent corner at the outer end of said recess and the other two of said apices being respectively disposed in adjacent ones of said drive surfaces at the inner end of said recess.

19. The device of claim 16, wherein said member is a drive socket for a socket wrench.

20. The device of claim 13, wherein each of said retaining surfaces is planar.

* * * * *